United States Patent
Lu et al.

(10) Patent No.: US 7,924,354 B2
(45) Date of Patent: Apr. 12, 2011

(54) LIQUID CRYSTAL DISPLAY PANEL AND PIXEL STRUCTURE THEREOF

(75) Inventors: Ying-Chi Lu, Hsin-Chu (TW); Tsung-Chin Cheng, Hsin-Chu (TW); Chih-Jen Hu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 233 days.

(21) Appl. No.: 12/409,538

(22) Filed: Mar. 24, 2009

(65) Prior Publication Data
US 2009/0273725 A1  Nov. 5, 2009

(30) Foreign Application Priority Data

Apr. 30, 2008  (TW) .............................. 97115924 A

(51) Int. Cl.
G02F 1/1343 (2006.01)
G09G 3/36 (2006.01)
H01L 29/04 (2006.01)
(52) U.S. Cl. ............... 349/38; 349/139; 257/59; 345/87
(58) Field of Classification Search .................... 349/33, 349/37, 38, 44, 139; 257/59, 57, 72; 345/87
See application file for complete search history.

(56) References Cited

U.S. PATENT DOCUMENTS

| 5,666,080 | A  | * | 9/1997 | Shou et al. .................. 327/361 |
| 5,810,504 | A  |   | 9/1998 | Rabinovich |
| 5,917,387 | A  | * | 6/1999 | Rice et al. .................... 333/174 |
| 7,821,003 | B2 | * | 10/2010 | Na et al. ........................ 257/59 |
| 2003/0164916 | A1 | | 9/2003 | Chien et al. |
| 2004/0196239 | A1 | * | 10/2004 | Kwon ............................ 345/92 |
| 2006/0033871 | A1 | | 2/2006 | Kim et al. |
| 2008/0129906 | A1 | * | 6/2008 | Lin et al. ........................ 349/38 |
| 2009/0279007 | A1 | * | 11/2009 | Shih et al. ...................... 349/37 |
| 2010/0309399 | A1 | * | 12/2010 | Yang et al. ..................... 349/37 |
| 2010/0328198 | A1 | * | 12/2010 | Tsubata ......................... 345/87 |
| 2010/0328562 | A1 | * | 12/2010 | Huang ........................... 349/38 |

FOREIGN PATENT DOCUMENTS

| CN | 1825599 A | 8/2006 |
| CN | 1921090 | 2/2007 |
| TW | 594353 | 6/2004 |

* cited by examiner

*Primary Examiner* — Akm E Ullah
(74) *Attorney, Agent, or Firm* — Winston Hsu; Scott Margo

(57) ABSTRACT

A pixel structure includes a bright region and a pale region, and the pale region includes a first capacitance coupling region and a second capacitance coupling region. The first capacitance coupling region includes a first coupling capacitor, the second capacitance coupling region includes a second coupling capacitor, and the first coupling capacitor and the second coupling capacitor are connected in parallel.

18 Claims, 8 Drawing Sheets

LIQUID CRYSTAL DISPLAY PANEL AND PIXEL STRUCTURE THEREOF

BACKGROUND OF THE INVENTION

1. Field of the Invention

The present invention relates to a liquid crystal display (LCD) panel and the related pixel structure, and more particularly, to a liquid crystal display panel and the related pixel structure, which has coupling capacitors electrically connected in parallel, for solving the color washout problem and increasing the aperture ratio.

2. Description of the Prior Art

Since liquid crystal displays (LCDs) have the advantages of portability, low power consumption, and low radiation, the LCDs have been widely used in various portable information products, such as notebooks, personal computer displays, personal digital assistants (PDAs), etc. Furthermore, the LCD even has a potential to replace conventional cathode-ray tube (CRT) monitors or televisions gradually.

In comparison with conventional CRT monitors, the viewing angle of the LCDs is not sufficiently wide to ensure high display quality, and therefore limits the application of the LCDs. Accordingly, a multi-domain vertical alignment (MVA) display is therefore made to increase the viewing angle. However, although the viewing angle can be broadened, another problem occurs to the LCDs. If a user looks at the monitor sideways with a larger viewing angle, the Gamma curve of the LCD shifts, or the color of the LCDs shifts toward white. That is called a color washout effect. The color washout effect is currently an obvious limitation to the MVA LCDs. It is a great challenge to solve the color washout problem of the liquid crystal display without affecting the aperture ratio.

SUMMARY OF THE INVENTION

It is therefore an objective of the present invention to provide a liquid crystal display panel and the related pixel structure so as to solve the color washout problem of the liquid crystal display in a large viewing angle condition and increase the aperture ratio.

The claimed invention provides a pixel structure. The claimed pixel structure includes a substrate comprising a plurality of pixel regions, each of the pixel regions comprising a bright region and a pale region, each of the pale regions comprising a first capacitance coupling region and a second capacitance coupling region; a plurality of switching elements, each of the switching elements being disposed in each of the pixel regions respectively; a plurality of patterned pixel electrodes, each of the patterned pixel electrodes being disposed in each of the pixel regions respectively and comprising a first pixel electrode disposed in the bright region and a second pixel electrode disposed in the pale region, wherein each of the first pixel electrodes is electrically connected to a drain of each of the switching elements in each of the pixel regions; a plurality of first coupling capacitors, each of the first coupling capacitors being disposed in each of the first capacitance coupling regions respectively; and a plurality of second coupling capacitors, each of the second coupling capacitors being disposed in each of the second capacitance coupling regions respectively, and each of the first coupling capacitors being connected in parallel with each of the second coupling capacitors in each of the pale region.

The claimed invention provides a pixel structure, which is formed in a pixel region of a substrate. The pixel region includes a bright region and a pale region, and both the bright region and the pale region includes a liquid crystal alignment region respectively. The claimed pixel structure includes a switching element, disposed in the pixel region; a first pixel electrode, disposed in the bright region, and electrically connected to the switching element; a coupling electrode, disposed in the pale region, electrically connected to the switching element, the coupling electrode having a first coupling electrode portion and a second coupling electrode portion, and the second coupling electrode portion corresponding to the liquid crystal alignment region of the pale region; and a second pixel electrode, disposed in the pale region, the second pixel electrode and the first coupling electrode portion being coupled as a first coupling capacitor, and the second pixel electrode and the second coupling electrode portion being coupled as a second coupling capacitor.

The claimed invention provides a liquid crystal display panel, which has a plurality of pixel regions. Each of the pixel regions includes a bright region and a pale region, and each bright region and each pale region include a liquid crystal alignment region respectively. The claimed liquid crystal display panel includes a first substrate having a plurality of pixel structures, each of the pixel structures being disposed in each of the pixel regions respectively, each of the pixel structure comprising: a switching element, disposed in the pixel region; a first pixel electrode, disposed in the bright region, and electrically connected to the switching element in the pixel region; a coupling electrode, disposed in the pale region, electrically connected to the switching element in the pixel region, the coupling electrode having a first coupling electrode portion and a second coupling electrode portion, and the second coupling electrode portion corresponding to the liquid crystal alignment region of the pale region; and a second pixel electrode, disposed in the pale region, the second pixel electrode and the first coupling electrode portion being coupled as a first coupling capacitor, and the second pixel electrode and the second coupling electrode portion being coupled as a second coupling capacitor; a second substrate, opposite to the first substrate, comprising a plurality of liquid crystal alignment structures, each of the liquid crystal alignment structures corresponding to each of the liquid crystal alignment regions; and a liquid crystal layer, disposed between the first substrate and the second substrate.

The pixel structure of the liquid crystal display panel includes a bright region and a pale region in the present invention, where the first pixel electrodes of the bright region are electrically connected to the drain directly. The voltage of the second pixel electrodes can be smaller than the voltage of the first pixel electrodes by usage of the coupling capacitor corresponding to the second pixel electrodes of the pale region. Thus, the color washout problem can be effectively solved. In addition, since the second coupling capacitor is disposed under the corresponding liquid crystal alignment structure, the present invention does not reduce the aperture ratio.

These and other objectives of the present invention will no doubt become obvious to those of ordinary skill in the art after reading the following detailed description of the preferred embodiment that is illustrated in the various figures and drawings.

DETAILED DESCRIPTION

One of the main characteristics of the liquid crystal display panel in the present invention is that each pixel region includes a bright region and a pale region, where the pixel electrode of the bright region is electrically connected to the drain of the switching element directly, and the pixel electrode of the pale region is not electrically connected to the drain. Thus, a larger voltage difference is formed between the common electrode of the top substrate and the pixel electrode of the bright region to drive the liquid crystal material, and a smaller voltage difference is formed between the common electrode of the top substrate and at least two coupling capacitors, which are connected in parallel. Accordingly, the pixel region can provide a bright region and a pale region to solve the color washout problem in a large viewing angle condition.

Figure 1:
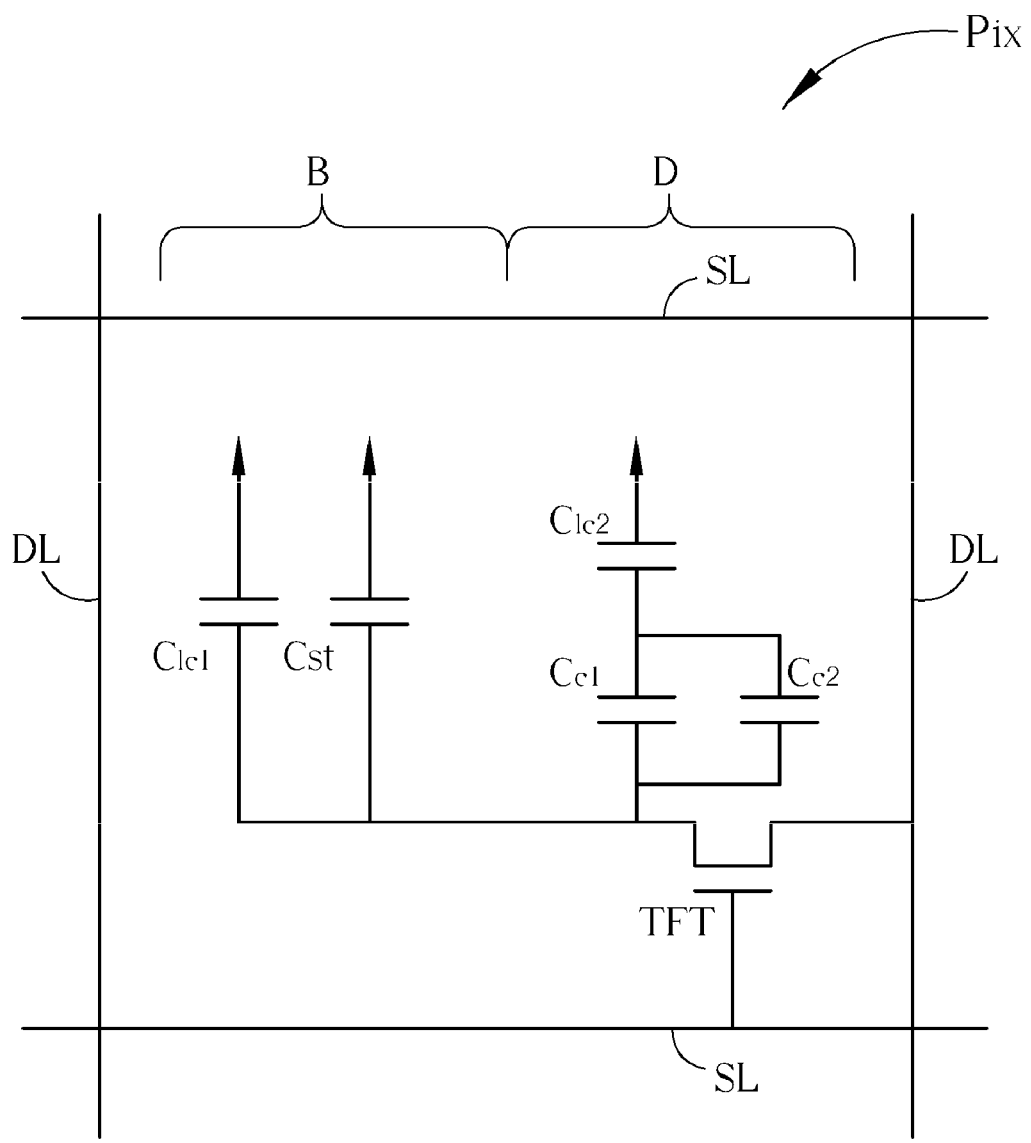
FIG. 1 is a schematic circuit diagram of a transmissive liquid crystal display panel according to embodiments of the present invention.

Please refer to FIG. 1, which is a schematic circuit diagram of a transmissive liquid crystal display panel according to embodiments of the present invention. As shown in FIG. 1, the liquid crystal display panel can include a plurality of scan lines SL, a plurality of data lines DL, a plurality of pixel regions Pix, and a plurality of switching elements, such as thin-film transistors TFT, where each switching element is disposed in one pixel region Pix. Each pixel region Pix includes a bright region B and a pale region D, where the bright region B has a first pixel electrode, and the pale region D has a second pixel electrode. Both the first pixel electrodes and the second pixel electrodes are disposed on surface of a bottom substrate. The drain of the thin-film transistor TFT is electrically connected to the first pixel electrode of the bright region B directly, so the first pixel electrode and the common electrode disposed on the top substrate can form a first liquid capacitor $C_{lc1}$ in the bright region B. At least one storage liquid capacitor $C_{st}$ is further included in the bright region B. On the other hand, the drain is not electrically connected to the second pixel electrode in the pale region D directly, while a patterned conductive layer, which is extended from the drain, and the second pixel electrode can form a first coupling capacitor $C_{c1}$ and a second coupling capacitor $C_{c2}$. The first coupling capacitor $C_{c1}$ and the second coupling capacitor $C_{c2}$ are electrically connected in parallel, and a second liquid capacitor $C_{lc2}$ is further formed between the common electrode of the top substrate and both the first coupling capacitor $C_{c1}$ and the second coupling capacitor $C_{c2}$.

Figure 2:
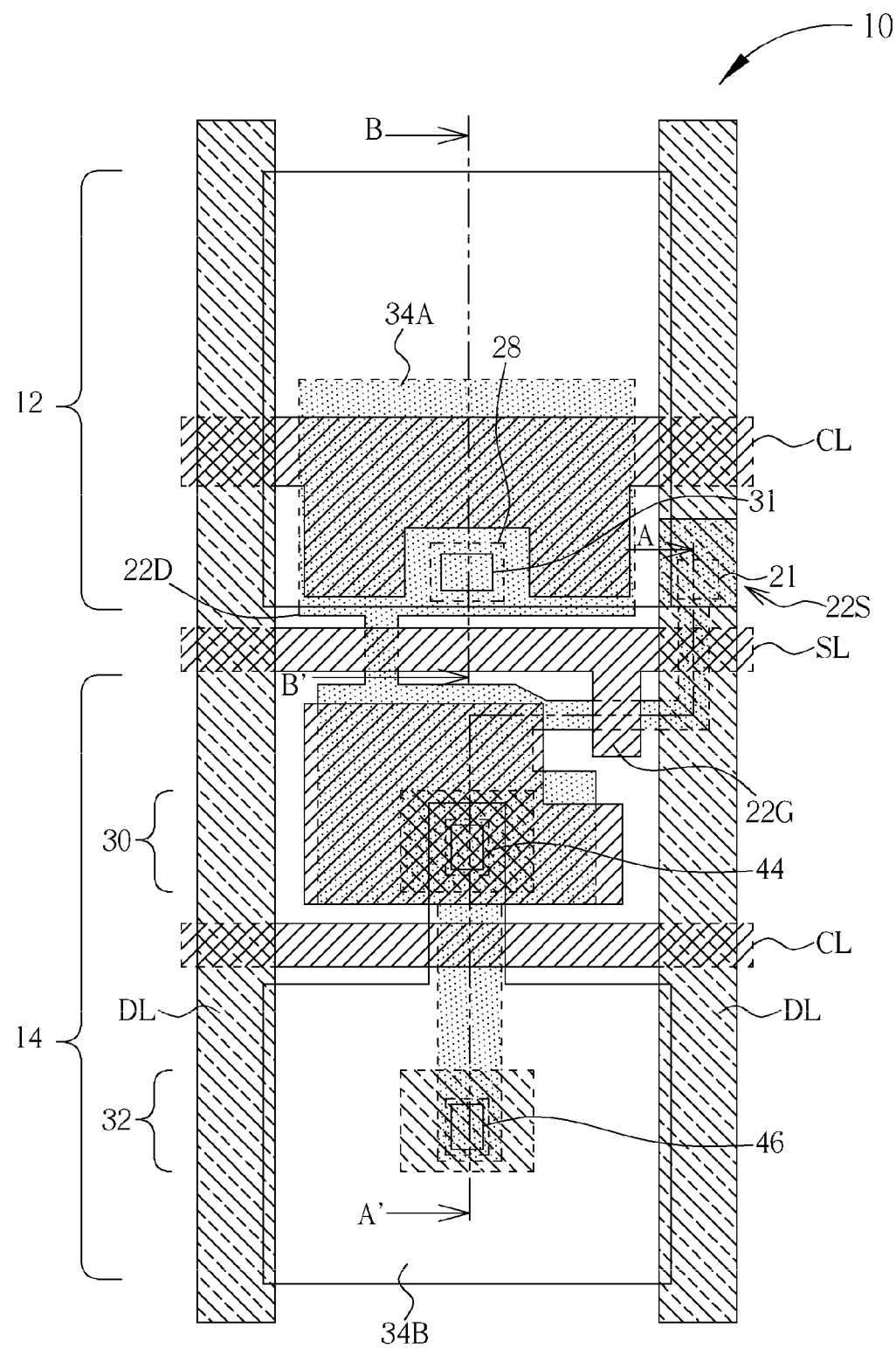
FIG. 2 through FIG. 4 are schematic diagrams illustrating a liquid crystal display panel according to a preferred embodiment of the present invention.
Figure 3:
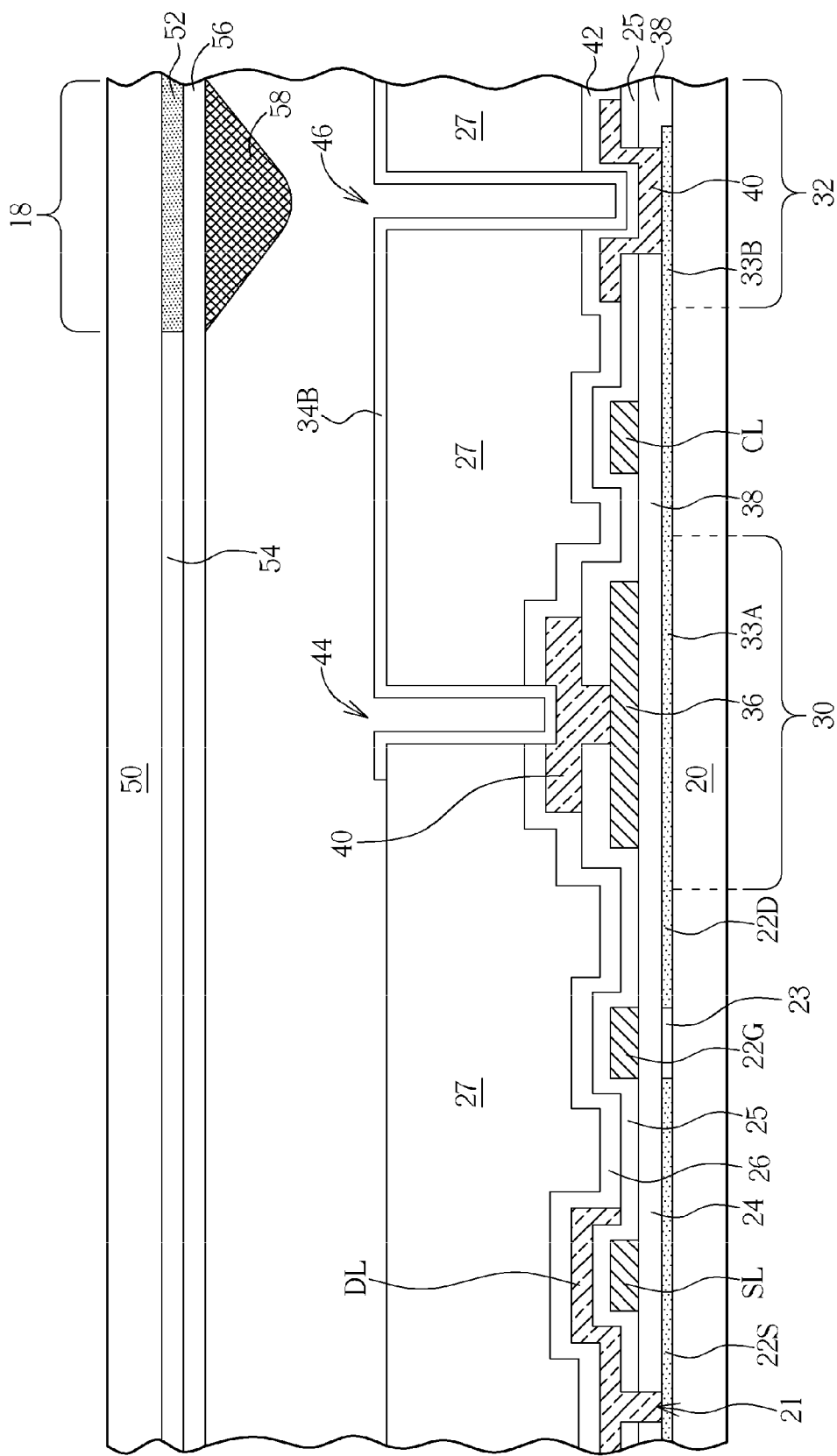
Figure 4:
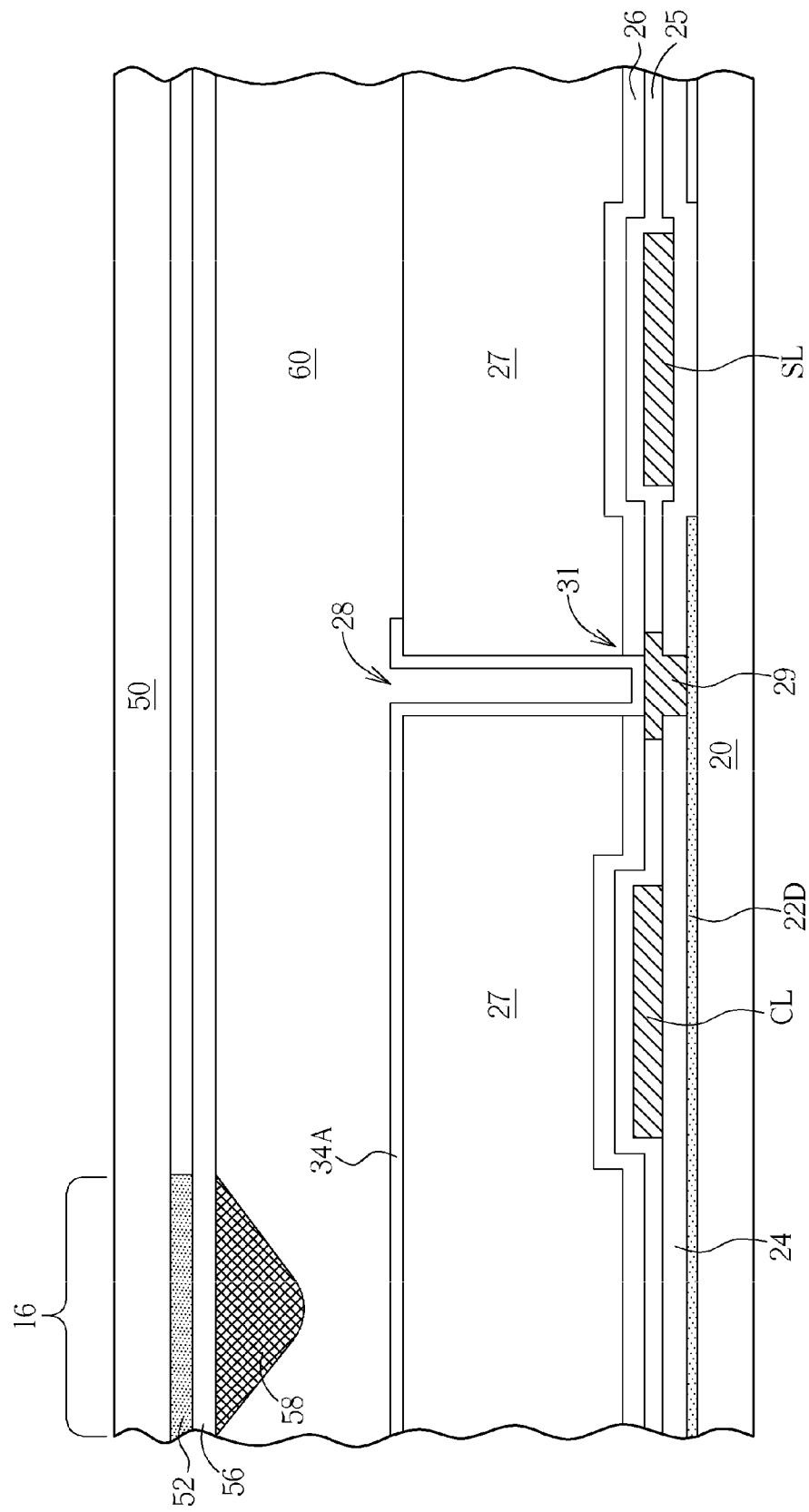

Please refer to FIG. 2 through FIG. 4, which are schematic diagrams illustrating a liquid crystal display panel according to a preferred embodiment of the present invention. Although an MVA LCD is taken as an example to illustrate this embodiment of the present invention, the present invention should not be limited to the MVA LCD, and can be applied to other types of liquid crystal display panels. In addition, FIG. 2 shows a top view of the pixel structure; FIG. 3 shows a cross-section diagram of the pixel structure along the line A-A' of FIG. 2; and FIG. 4 shows a cross-section diagram of the pixel structure along the line B-B' of FIG. 2. As shown in FIG. 2 through FIG. 4, the liquid crystal display panel has a plurality of pixel regions 10 in this embodiment (for clarity, only one of the pixel regions is shown in the drawings). Each of the pixel regions 10 includes a bright region 12 and a pale region 14, and the bright region 12 and the pale region 14 include a liquid crystal alignment region 16 and a liquid crystal alignment region 18 respectively. The liquid crystal display panel includes a first substrate 20. The first substrate 20 has a plurality of pixel structures, and each of the pixel structures corresponds to a pixel region 10 respectively. Each pixel structure includes a scan line SL, a data line DL, and a switching element, such as a thin-film transistor, disposed in the corresponding pixel region 10. The switching element includes a gate 22G, a semiconductor layer 23, a source 22S and a drain 22D. A gate insulating layer 24 is included between the semiconductor layer 23 and the gates 22G. Two dielectric layers 25, 26, at least an insulating layer (also called a protecting layer) 27 and an alignment film (not shown in the drawings) are included on the gates 22G. The dielectric layer 26 can function as a second capacitance dielectric layer, and that is explained later in the following description. In addition, the dielectric layers 25, 26 have a contact hole 21 corresponding to the position of the source 22S, so the data line DL can be electrically connected to the source 22S of the switching element 22 directly.

The liquid crystal display panel includes a plurality of patterned pixel electrodes, and each patterned pixel electrode is disposed in each pixel region 10 respectively. The patterned pixel electrodes can be transparent conductive material, such as indium tin oxide (ITO). Each of the patterned pixel electrodes includes a first pixel electrode 34A disposed in the bright region 12, and a second pixel electrode 34B disposed in the pale region 14. The insulating layer 27 of the bright region 12 has a first contact hole 28, while the dielectric layers 25, 26 have a fourth contact hole 31 corresponding to the first contact hole 28. Moreover, a pad layer 29 is included on the drain 22D of the switching element 22, and is electrically connected to the drain 22D. The first contact hole 28 and the fourth contact hole 31 expose the pad layer 29, so the first pixel electrodes 34A can fill the first contact hole 28 and the fourth contact hole 31, and contact the pad layer 29. Accordingly, the first pixel electrodes 34A can be electrically connected to the drain 22D of the switching element 22 through the pad layer 29, while the second pixel electrodes 34B of the pale region 14 are not electrically connected to the first pixel electrodes 34A.

A patterned conductive layer is included in the pale region 14 as a coupling electrode. In this embodiment, the semiconductor layer 23 is made from poly-silicon. The coupling electrode and the semiconductor layer 23 can be made from the same material layer, and can increase electric conductivities by ion implantation. The coupling electrode is electrically connected to the drain 22D of the switching element 22. In addition, the pale region 14 includes a first capacitance coupling region 30 and a second capacitance coupling region 32, while a first coupling capacitor is included in the first capacitance coupling region 30, and a second coupling capacitor is included in the second capacitance coupling region 32. The coupling electrode has a first coupling electrode portion 33A disposed in the first capacitance coupling region 30, and a second coupling electrode portion 33B disposed in the second capacitance coupling region 32. Furthermore, the pixel structure further includes a plurality of first patterned metal layers 36 disposed in each first capacitance coupling region 30 respectively (the first patterned metal layers 36, the scan lines SL, the gates 22G, the common lines CL and the pad layer 29 are composed of the same metal layer), a plurality of first capacitance dielectric layers 38 disposed between each patterned conductive layer (applied as the coupling electrode) and each first patterned metal layer 36 respectively (the first capacitance dielectric layers 38 and each gate insulating layer 24 are made from the same material layer), a plurality of second patterned metal layers 40 disposed in each first capacitance coupling region 30 and each second capacitance coupling region 32 respectively (the second patterned metal layers 40 and data line DL are made from the same metal layer), and a plurality of second capacitance dielectric layers 42 disposed between each second pixel electrode 34B and each second patterned metal layers 40 respectively (the second capacitance dielectric layers 42 and the dielectric layer 26 are composed of the same material layer above the gates 22G).

The dielectric layer 25 has an opening in the first capacitance coupling region 30, so that the second patterned metal layers 40 can be electrically connected to the first patterned metal layer 36. In addition, the second capacitance dielectric layer 42 and the insulating layer 27 have a second contact hole 44, so that the second pixel electrode 34B can be electrically connected to the second patterned metal layer 40. The second pixel electrode 34B, the second patterned metal layer 40 and the first patterned metal layer 36 form the top electrode of the first coupling capacitor, and the first coupling electrode portion 33A forms the bottom electrode of the first coupling capacitor. The first coupling electrode portion 33A and the first capacitance dielectric layer 38, which is disposed between the top electrode and the bottom electrode, form the first coupling capacitor.

On the other hand, the first capacitance dielectric layer 38 and the dielectric layer 25 have an opening in the second capacitance coupling region 32, so that the second patterned metal layer 40 can be electrically connected to the second coupling electrode portion 33B, and forms the bottom electrode of the second coupling capacitor. The second capacitance dielectric layer 42 covers the surface of the second patterned metal layers 40. The insulating layer 27 has a third contact hole 46, so that the second pixel electrodes 34 can be formed on the surface of the second capacitance dielectric layer 42, and functions as the top electrode of the second coupling capacitor.

The liquid crystal display panel further includes a second substrate 50, which is opposite to the first substrate 20, and a liquid crystal layer 60 disposed between the first substrate 20 and the second substrate 50. The second substrate 50 includes a plurality of black matrix patterns 52 disposed on the side facing the first substrate 20, a color filter layer 54, a common electrode 56 disposed on the surface of the black matrix patterns 52 and on the surface of the color filter layer 54, an alignment film (not shown in the drawings), and a plurality of liquid crystal alignment structures 58 disposed on the surface of the alignment film. The black matrix patterns 52 are disposed in both the bright region 12 and the pale region 14 respectively. The liquid crystal alignment structures 58 correspond to the liquid crystal alignment region 16 of the bright region 12 and the liquid crystal alignment region 18 of the pale region 14 respectively. In this embodiment, the liquid crystal alignment structures 58 include protrusions for multi-domain vertical alignment (MVA) display, and should not be limited to the protrusions. Other types of liquid crystal alignment structures, such as slits, can be adopted.

The liquid crystal display panel of the present invention can have different pixel structures in other embodiments. Please refer to the following description. For clarity, like numbered numerals designate similar or the same parts, regions or elements in the following description, and the same portions of the description are omitted.

Figure 5:
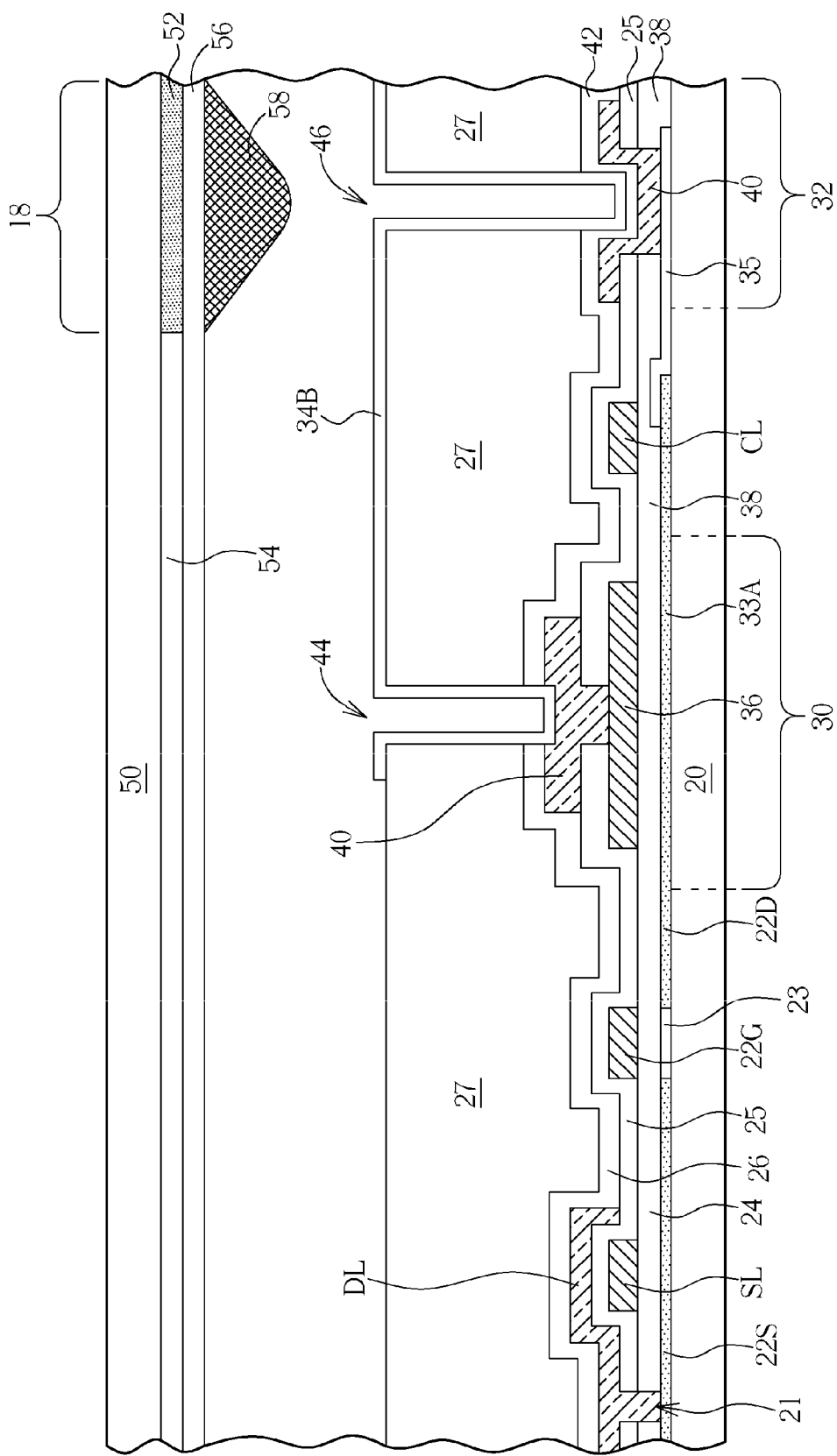
FIG. 5 is a schematic diagram illustrating a pixel structure of a liquid crystal display panel according to another preferred embodiment of the present invention.

Please refer to FIG. 5, which is a schematic diagram illustrating a pixel structure of a liquid crystal display panel according to another preferred embodiment of the present invention. As shown in FIG. 5, different from the embodiment shown in FIG. 2, the size of the coupling electrode is smaller in this embodiment, so no second coupling electrode portion 33B is included in the second capacitance coupling region 32, while the first coupling electrode portion 33A is still included in the first capacitance coupling region 30. In each second capacitance coupling region 32, a transparent patterned conductive layer 35 is further included to replace the above second coupling electrode portion 33B, and is electrically connected to the first coupling electrode portion 33A. In such a case, the second pixel electrodes 34B can still form a top electrode of the second coupling capacitor in the second capacitance coupling region 32, while the second patterned metal layer 40 is electrically connected to the transparent patterned conductive layers 35, and forms a bottom electrode of the second coupling capacitor. Since the transparent patterned conductive layers 35 can replace the second coupling electrode portion 33B, it is an advantage of this embodiment that the portions not covered by the second patterned metal layers 40 can be transparent to light, so the aperture ratio of the pixel structure can be further increased.

Figure 6:
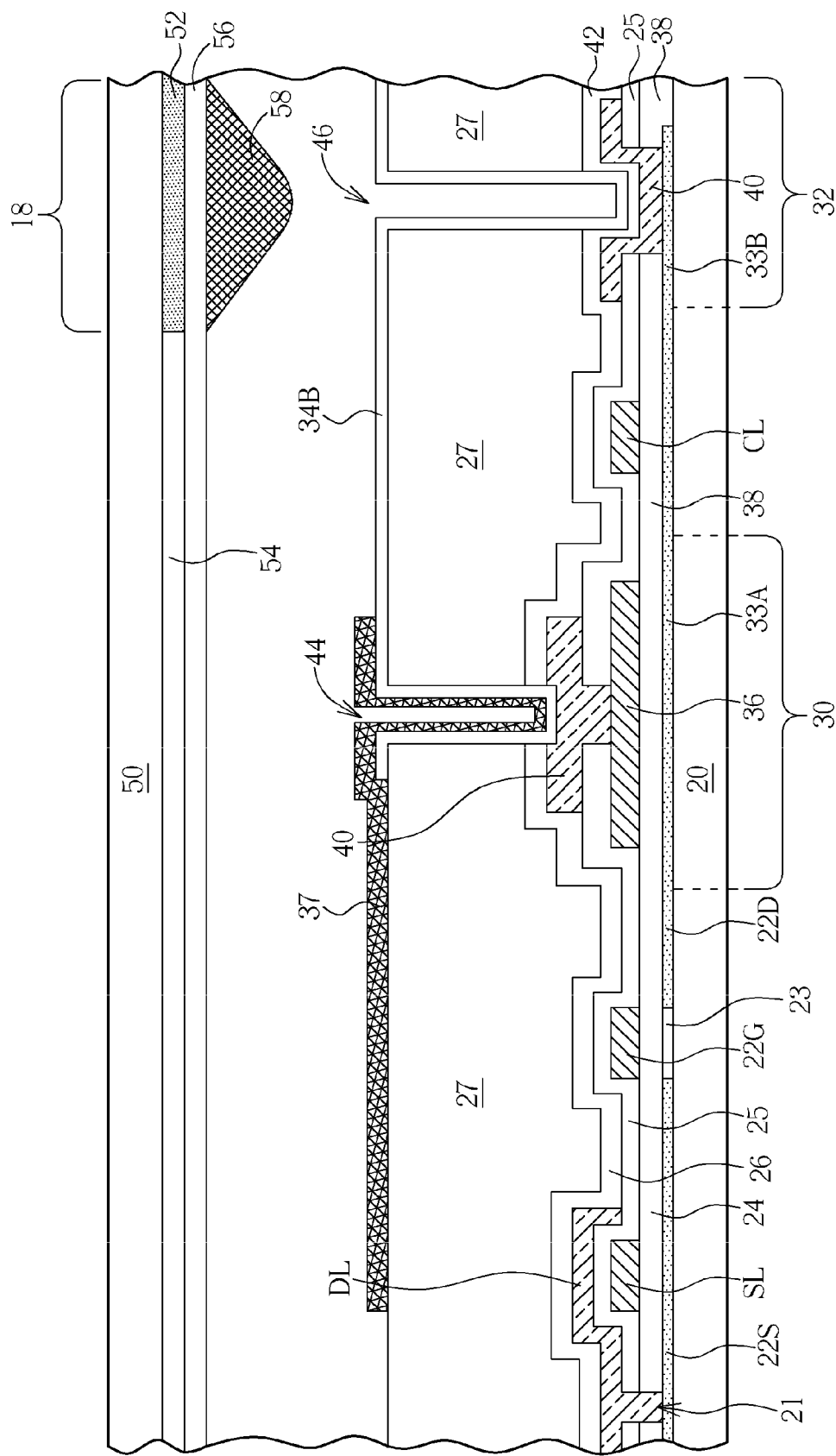
FIG. 6 is a schematic diagram illustrating a pixel structure of a liquid crystal display panel according to another preferred embodiment of the present invention.

Please refer to FIG. 6, which is a schematic diagram illustrating a pixel structure of a liquid crystal display panel according to another preferred embodiment of the present invention. As shown in FIG. 6, the designs of the coupling capacitors in this embodiment and those in FIG. 2 are the same. Different from the embodiment shown in FIG. 2, the liquid crystal display panel is a transflective liquid crystal display panel in this embodiment. Accordingly, a reflective electrode 37 is further included on partial surface of the insulating layer 27 in each pixel region 10. The reflective electrode 37 can be made of materials with a high reflectance, such as aluminum, and can have micro-protruding patterns on its surface for increasing the scattering effect. Since portions of the pixel region 10, such as the storage liquid capacitor regions or the coupling capacitor regions, are opaque regions, the reflective electrode 37 can be disposed in the opaque regions for increasing the usage of ambient light in the present invention. Therefore, brightness of the liquid crystal display panel can be improved. It should be noticed that the reflective electrode 37 is electrically connected to the second pixel electrode 34B in this embodiment, and forms a portion of the pale region 12.

Figure 7:
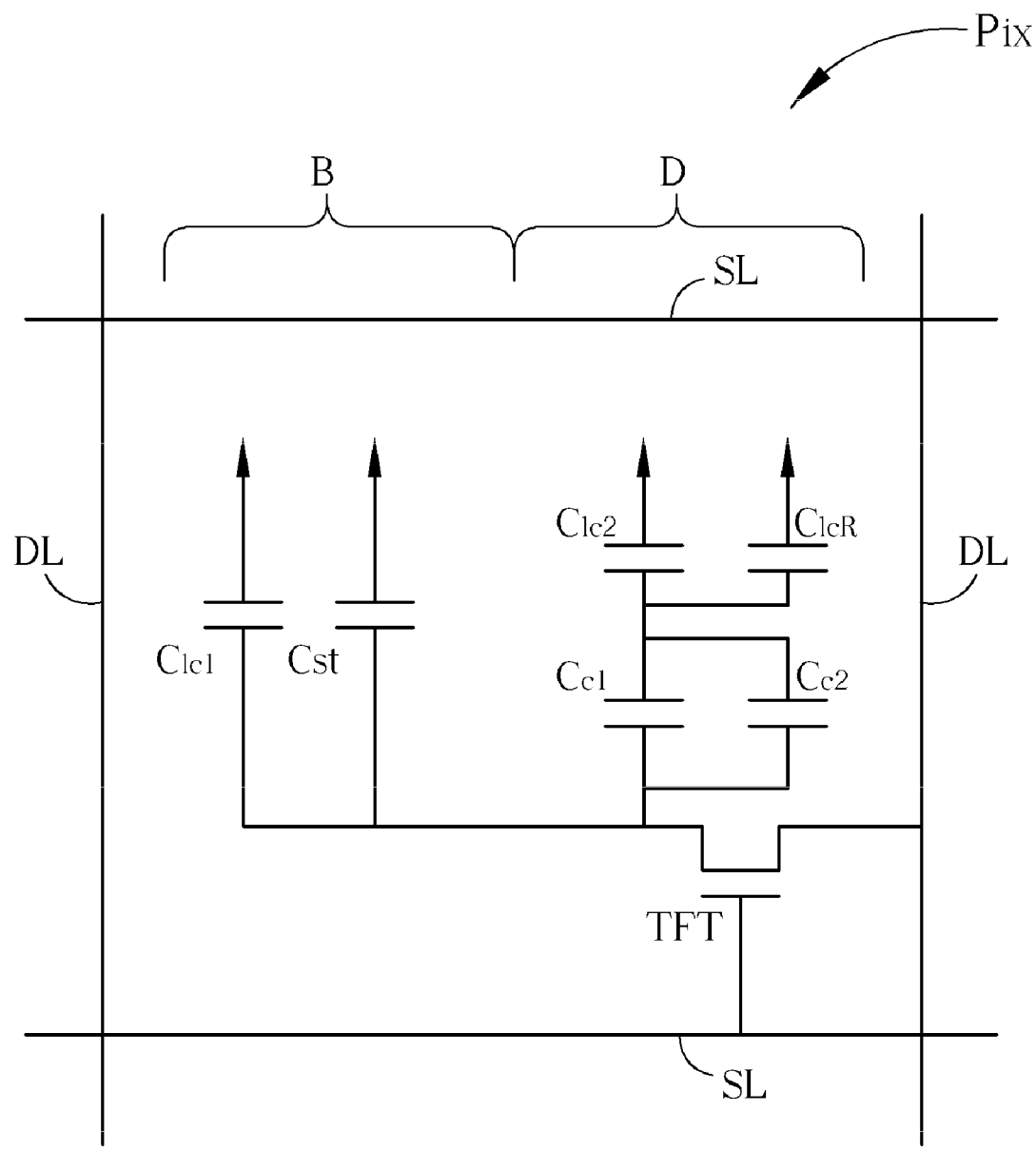
FIG. 7 is a schematic circuit diagram of the transflective liquid crystal display panel according to embodiments of the present invention.

Please refer to FIG. 7, which is a schematic circuit diagram of the transflective liquid crystal display panel according to embodiments of the present invention. As shown in FIG. 7, the liquid crystal display panel includes a plurality of scan lines SL, a plurality of data lines DL, a plurality of pixel regions Pix, and a plurality of switching elements, such as thin-film transistors TFT, where each switching element is disposed in one pixel region Pix. Each pixel region Pix includes a bright region B and a pale region D, where the bright region B has a first pixel electrode, and the pale region D has a second pixel electrode. The drain of the thin-film transistor TFT is electrically connected to the first pixel electrode of the bright region B directly, so the first pixel electrode and the common electrode of the top substrate form a first liquid capacitor $C_{lc1}$ in the bright region B. At least one storage liquid capacitor $C_{st}$ is further included in the bright region B. On the other hand, the drain is not electrically connected to the second pixel electrode directly in the pale region D, and a patterned conductive layer extended from the drain and the second pixel electrode form a first coupling capacitor $C_{c1}$ and a second coupling capacitor $C_{c2}$. The first coupling capacitor $C_{c1}$ and the second coupling capacitor $C_{c2}$ are connected in parallel, and a second liquid capacitor $C_{lc2}$ is further formed between the common electrode of the top substrate and both the first coupling capacitor $Cc_1$ and the second coupling capacitor $Cc2$. In comparison with the circuit of the transmissive liquid crystal display panel, a reflective liquid capacitor $C_{lcR}$ is further formed between the reflective electrode and the common electrode of the top substrate, since the transflective liquid crystal display panel further includes reflective electrodes electrically connected to the second pixel electrodes in the pale regions D of the pixel regions Pix.

Figure 8:
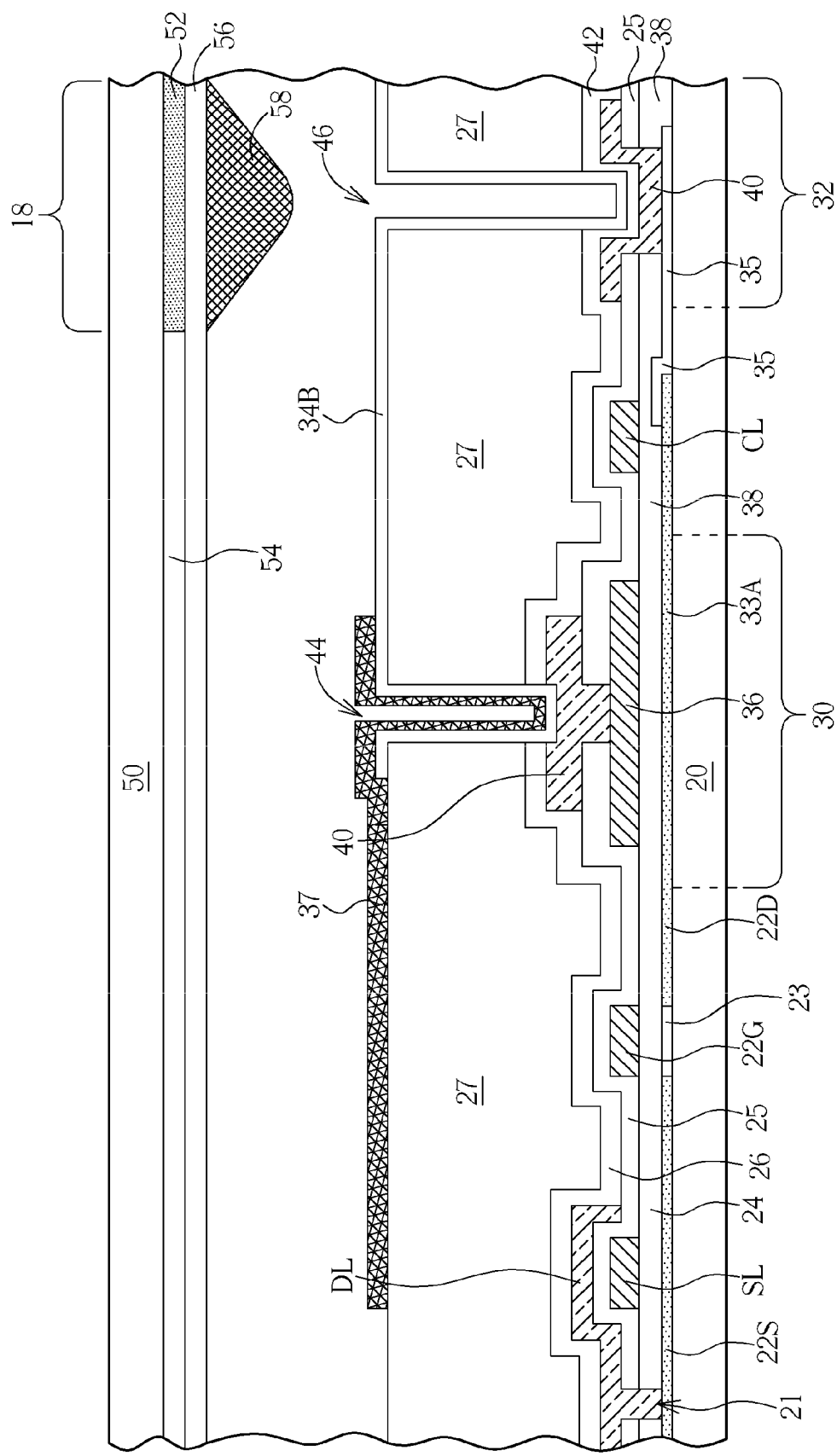
FIG. 8 is a schematic diagram illustrating a pixel structure of a liquid crystal display panel according to another preferred embodiment of the present invention.

Please refer to FIG. 8, which is a schematic diagram illustrating a pixel structure of a liquid crystal display panel according to another preferred embodiment of the present invention. As shown in FIG. 8, the liquid crystal display panel is a transflective liquid crystal display panel in this embodiment, while the embodiment in FIG. 6 also shows a transflective liquid crystal display panel. The main difference between this embodiment and the embodiment in FIG. 6 is the designs of the coupling capacitors. The design of the coupling capacitors in this embodiment and the design of the coupling capacitors in FIG. 4 are the same. Thus, the transparent patterned conductive layer 35 is included in each second capacitance coupling region 32 in this embodiment.

Accordingly, one of the main characteristics of the liquid crystal display panel is that each pixel region includes a bright region and a pale region in the present invention, where the first pixel electrode of the bright region is electrically connected to the drain directly. The voltage of the second pixel electrode can be smaller than the voltage of the first pixel electrode by usage of the coupling capacitors corresponding to the second pixel electrode of the pale region. Thus, the color washout problem can be effectively solved. The voltage of the second pixel electrodes can be controlled by the capacitance of the coupling capacitors. Usually, the voltage of the second pixel electrode is preferably 0.7 times the voltage of the first pixel electrode for solving the color washout problem. In each pixel region, the area ratio of the bright region to the pale region is preferably 35:65 for solving the color washout problem. It should be understood that the ratio of voltages and the ratio of areas can be adjusted in practice for other factors.

In addition, since the coupling capacitors include the first coupling capacitor and the second coupling capacitor connected in parallel, and the second coupling capacitor is disposed under the black matrix pattern and under the liquid crystal alignment structure, the present invention does not reduce the aperture ratio. In such a case, the area of the first coupling capacitor can be reduced for increasing the aperture ratio, and the reduced capacitance of the first coupling capacitor can be offset by the second coupling capacitor for providing the same total capacitance. It should be understood that the number of the coupling capacitors connected in parallel should not limited to two in the present invention. The number of the coupling capacitors connected in parallel can be increased according to the design of the pixel structure and the requirement of capacitance, and the size and the shape of the coupling capacitors can also be adjusted.

Those skilled in the art will readily observe that numerous modifications and alterations of the device and method may be made while retaining the teachings of the invention.

What is claimed is:

1. A pixel structure, comprising:
    a substrate comprising a plurality of pixel regions, each of the pixel regions comprising a bright region and a pale region, each of the pale regions comprising a first capacitance coupling region and a second capacitance coupling region;
    a plurality of switching elements, each of the switching elements being disposed in each of the pixel regions respectively;
    a plurality of patterned pixel electrodes, each of the patterned pixel electrodes being disposed in each of the pixel regions respectively and each of the pixel regions comprising a first pixel electrode disposed in the bright region and a second pixel electrode disposed in the pale region, each of the first pixel electrodes being electrically connected to a drain of each of the switching elements in each of the pixel regions;
    a plurality of first coupling capacitors, each of the first coupling capacitors being disposed in each of the first capacitance coupling regions respectively; and
    a plurality of second coupling capacitors, each of the second coupling capacitors being disposed in each of the second capacitance coupling regions respectively, and each of the first coupling capacitors being connected in parallel with each of the second coupling capacitors in each of the pale region.

2. The pixel structure of claim 1, further comprising:
    a plurality of patterned conductive layers, each of the patterned conductive layers being electrically connected to the drain of each of the switching elements in each of the pixel regions respectively;
    a plurality of first patterned metal layers, each of the first patterned metal layers being disposed in each of the first capacitance coupling regions respectively; and
    a plurality of second patterned metal layers, each of the second patterned metal layers being disposed in each of the first capacitance coupling regions and each of the second capacitance coupling regions respectively.

3. The pixel structure of claim 2, wherein each of the second pixel electrodes, each of the second patterned metal layers and each of the first patterned metal layers are electrically connected in each of the first capacitance coupling regions, and form a top electrode of each first coupling capacitor, while each of the patterned conductive layers forms a bottom electrode of the first coupling capacitor.

4. The pixel structure of claim 3, further comprising a plurality of first capacitance dielectric layers, and each of the first capacitance dielectric layers being disposed between each of the patterned conductive layers and each of the first patterned metal layers respectively.

5. The pixel structure of claim 2, wherein each of the second pixel electrodes forms a top electrode of each of the second coupling capacitors in each of the second capacitance coupling regions, while each of the second patterned metal layers and each of the patterned conductive layers are electrically connected, and form a bottom electrode of each of the second coupling capacitors.

6. The pixel structure of claim 5, further comprising a plurality of second capacitance dielectric layers, and each of the second capacitance dielectric layers being disposed between each of the second pixel electrodes and each of the second patterned metal layers respectively.

7. The pixel structure of claim 2, further comprising a plurality of transparent patterned conductive layers, each of the transparent patterned conductive layers being disposed in each of the second capacitance coupling regions respectively, and each of the transparent patterned conductive layers and each of the patterned conductive layers are electrically connected.

8. The pixel structure of claim 7, wherein, each of the second pixel electrodes forms a top electrode of each of the second coupling capacitors in each of the second capacitance coupling regions, while each of the second patterned metal layers and each of the transparent patterned conductive layers are electrically connected, and form a bottom electrode of each of the second coupling capacitors.

9. The pixel structure of claim 6, further comprising an insulating layer disposed between the patterned pixel electrodes and the second capacitance dielectric layers.

10. The pixel structure of claim 9, wherein the insulating layer and each of the second capacitance dielectric layers have at least a contact hole in each of the first capacitance coupling regions respectively, and each of the second pixel electrodes is electrically connected to each of the second patterned metal layers through each of the contact holes.

11. The pixel structure of claim 9, wherein the insulating layer has at least a contact hole in each of the second capacitance coupling regions, so that each of the second pixel electrodes is formed on a surface of each of the second capacitance dielectric layers in each of the second capacitance coupling regions.

12. The pixel structure of claim 2, further comprising a plurality of reflective electrodes, and each of the reflective electrodes being electrically connected to each of the patterned pixel electrodes.

13. The pixel structure of claim 2, wherein each of the switching elements includes a gate, and the gates and the first patterned metal layers are composed of the same metal layer.

14. The pixel structure of claim 1, wherein the first pixel electrodes are not electrically connected to the second pixel electrodes.

15. A pixel structure, formed in a pixel region of a substrate, the pixel region comprising a bright region and a pale region, and both the bright region and the pale region comprising a liquid crystal alignment region respectively, the pixel structure comprising:
   a switching element, disposed in the pixel region;
   a first pixel electrode, disposed in the bright region, and electrically connected to the switching element;
   a coupling electrode, disposed in the pale region, electrically connected to the switching element, the coupling electrode having a first coupling electrode portion and a second coupling electrode portion, and the second coupling electrode portion corresponding to the liquid crystal alignment region of the pale region; and
   a second pixel electrode, disposed in the pale region, the second pixel electrode and the first coupling electrode portion being coupled as a first coupling capacitor, and the second pixel electrode and the second coupling electrode portion being coupled as a second coupling capacitor.

16. The pixel structure of claim 15, wherein the first coupling capacitor and the second coupling capacitor are connected in parallel.

17. A liquid crystal display panel, having a plurality of pixel regions, each of the pixel regions comprising a bright region and a pale region, each of the bright regions and each of the pale regions comprising a liquid crystal alignment region respectively, the liquid crystal display panel comprising:
   a first substrate having a plurality of pixel structures, each of the pixel structures being disposed in each of the pixel regions respectively, each of the pixel structure comprising:
      a switching element, disposed in the pixel region;
      a first pixel electrode, disposed in the bright region, and electrically connected to the switching element in the pixel region;
      a coupling electrode, disposed in the pale region, electrically connected to the switching element in the pixel region, the coupling electrode having a first coupling electrode portion and a second coupling electrode portion, and the second coupling electrode portion corresponding to the liquid crystal alignment region of the pale region; and
      a second pixel electrode, disposed in the pale region, the second pixel electrode and the first coupling electrode portion being coupled as a first coupling capacitor, and the second pixel electrode and the second coupling electrode portion being coupled as a second coupling capacitor;
   a second substrate, opposite to the first substrate, comprising a plurality of liquid crystal alignment structures, each of the liquid crystal alignment structures corresponding to each of the liquid crystal alignment regions; and
   a liquid crystal layer, disposed between the first substrate and the second substrate.

18. The pixel structure of claim 17, wherein the first coupling capacitor and the second coupling capacitor are connected in parallel in each of the pixel regions.

* * * * *